3,068,297
ISOMERIZATION OF HALOBIPHENYLS
Harold I. Weingarten, Centerville, Ohio, assignor to Monsanto Chemical Company, St. Louis, Mo., a corporation of Delaware
No Drawing. Filed Apr. 21, 1961, Ser. No. 104,519
11 Claims. (Cl. 260—649)

This invention relates to an improved process for effecting the conversion of by-product halogenated biphenyls to more useful liquid dielectric compositions having an improved dielectric constant. More particularly the instant invention is directed to the process of treating certain by-product chlorinated biphenyl compositions to isomerize certain components thereof to effect an improved yield of a high dielectric constant liquid composition, and is a continuation-in-part application of my copending application Serial No. 818,530, filed June 8, 1959, which application is incorporated herein by reference.

It is the principal object of the present invention to provide an improved yield of polyhalogenated biphenyl compositions having a dielectric constant at up to 100,000 cycles and 25° C. greater than the apparent prior art maximum of about 5.8. Another object of this invention is to provide a process for the preparation of modified polyhalogenated biphenyl compositions for use as dielectric fluids. A further object of this invention relates to the preparation of insulating elements for use in various electrical apparatus, whereby the novel liquid dielectric composition is impregnated in paper, fabric and other porous materials. Other objects of this invention will be apparent to those skilled in the art from the following disclosure.

It has now been found that by-product dihalogenated biphenyl compositions, particularly those rich in 2,2'-dihalobiphenyl, of my parent application can be isomerized in the presence of aluminum chloride and anhydrous hydrogen chloride at temperatures from about 50° C. to about 250° C. and preferably from about 70° C. to about 200° C. and more preferably still from about 70° C. to about 150° C. for a time of from about 15 minutes to about 10 hours or more and preferably from about 1 hour to about 5 hours. The amount of anhydrous aluminum chloride isomerization catalyst employed in the isomerization reaction can vary from about 0.1 to about 5 or more, and preferably from about 0.5 to about 2, weight percent based on the halobiphenyl composition. The amount of anhydrous hydrogen chloride employed with the aluminum chloride can vary from an amount sufficient to about saturate the reaction mixture at the reaction temperature in a closed system, or the hydrogen chloride can be passed through the reaction mixture constantly during the course of the isomerization reaction. It will be understood that the reaction mixture can be treated with hydrogen chloride at room temperature prior to heating or added after heating said reaction mixture to a higher temperature.

It will be understood that other isomerization catalysts than aluminum chloride can be employed in the present invention. Such additional catalysts are aluminum bromide and gallium trichloride. Furthermore mixtures of the above-listed isomerization catalysts can be employed. The amount of the isomerization catalyst employed can vary as set forth hereinabove for aluminum chloride per se.

The halogen substituents of the biphenyl compounds are the various members of the group of halogen atoms having an atomic number up to 53, i.e. fluorine, chlorine, bromine, and iodine, and the further halogenation of said compounds can be effected with one or more members of the aforesaid group. The chloro-substituted biphenyl compounds and mixtures thereof are the preferred materials for use as dielectric compositions, and will be employed hereinafter to more fully illustrate the improved process of the instant invention.

The process of my parent application Serial No. 818,530, wherein 4-chlorobiphenyl and 2,4-dichlorobiphenyl components are substantially eliminated in the reaction mixture, is one preferred embodiment of preparing the chlorinated biphenyl composition to be employed as the starting material for the present invention. The preferred embodiment of the prior process is that wherein biphenyl is monochlorinated in the presence of ferric chloride and then after addition of finely divided sulfur the reaction mixture is further chlorinated to the dichlorobiphenyl composition, i.e. the process of Example 4 of said parent application, wherein the ratio of 4,4'-dichlorobiphenyl to 2,2'-dichlorobiphenyl isomers is substantially reduced and the 4,4'-isomer is removed by fractional crystallization, whereby the by-product is rich in the 2,2'-isomer, after the reaction mixture is fractionally distilled to remove the desired 2,4'-dichlorobiphenyl product.

It will be understood that any other dihalogenation of biphenyl process can be employed and the fraction rich in 2,2'-isomer separated by fractional distillation or otherwise and employed as the starting material in the present isomerization process to provide a trihalobiphenyl composition having improved dielectric properties. Preferably compositions containing from about 50 to about 100 weight percent of a 2,2'-dihalobiphenyl compound are employed in the present process.

The following examples are illustrative of the present invention.

*Example 1*

A mixed chlorobiphenyl composition containing about 32 percent chlorine prepared by the chlorination of biphenyl in the presence of a ferric chloride catalyst at about 130° C. was found to consist of the following components in terms of mol percent: biphenyl 1.0%; 2-chlorobiphenyl 17.9%; 4-chlorobiphenyl 8.2%; 2,2' dichlorobiphenyl 13.9%; 2,4-dichlorobiphenyl 5.7%; 2,4'-dichlorobiphenyl 32.1%; 4,4'-dichlorobiphenyl 12.5%; and trichlorobiphenyls 8.7%. This mixed composition was fractionally distilled through a one-inch, 30-plate Oldershaw column at 15 mm. mercury head pressure and the fraction having a boiling point range of from about 157° to about 159° C. at 15 mm. of mercury was found to consist of about 76% 2,2'-dichlorobiphenyl, 9% other dichlorobiphenyls (4% 2,6-dichlorobiphenyl, 3% 2,5- and 2,4-dichlorobiphenyls, and 1% each of 2,3'- and 2,4'-dichlorobiphenyls) and 15% monochlorobiphenyls (10% 4-chlorobiphenyl, 3% 2-chlorobiphenyl and 2% 3-chlorobiphenyl), wherein the values are given in mol percent.

A 176-g. portion of the aforesaid composition rich in 2,2'-dichlorobiphenyl was introduced into a reaction vessel and 1.5 g. of anhydrous aluminum chloride added thereto. The reaction vessel then was placed in a constant temperature bath held at about 100° C. for a period of 3 hours and dry hydrogen chloride gas continuously was passed through the mixture. The reaction mixture was filtered and the filtrate evaluated by vapor phase chromatographic analysis and, based on 100% 2,2'-dichlorobiphenyl in the original composition, found to consist of about 30% 2,2'-dichlorobiphenyl; 51% 2,3'-dichlorobiphenyl; 9% 2,4'-dichlorobiphenyl; and the remaining constitutents comprising about 9% of the reaction mixture were 3,3'-, 3,4'-, and 4,4'-dichlorobiphenyls. The reaction mixture was then fractionally distilled through a packed Todd column and a 50.7 g. cut boiling at 160° to 161° C./15 mm. mercury pressure separated from the balance of the treated product. This cut was found to consist of about 95% of 2,4'- and 2,3'-dichlorobiphenyls, i.e. this cut represents about 28.8% of the 2,2'-dichlorobiphenyl-rich composition per se isomerized in the aforesaid manner. This composition was found to have a dielectric constant at 100 cycles and 25° C. of 7.0.

A 40 g. portion of the cut consisting of about 95% of the compounds 2,4'- and 2,3'-dichlorobiphenyls was introduced into a reaction vessel together with about 0.1 g. of ferric chloride and sufficient chlorine introduced to convert the chlorinated biphenyls to the trichlorobiphenyl stage over a period of about 0.5 hour and at a temperature of 100° C. The reaction product was distilled and 43.5 g. thereof recovered. This composition was found to have a chlorine content of 40.0 percent and a dielectric constant at 100 cycles and 23° C. of 6.7.

The aforesaid composition can be used per se as a dielectric fluid or can be combined with other dielectric fluid compositions, e.g. the composition of my aforesaid parent application. Additionally the aforesaid cut consisting primarily of 2,3'- and 2,4'-dichlorobiphenyls can be used per se or can be combined with other dielectric fluid compositions. However, the further halogenation thereof is generally desired, since the trihalobiphenyl compositions have substantially lower volatility values than do the dihalobiphenyl compositions. Accordingly, for general use in electrical capacitors and other applications the reduction in volatility by the further chlorination offsets the small decrease in the dielectric constant. Furthermore this small decrease in dielectric constant may be improved to give higher dieletric constant compositions by a fractional distillation procedure to remove some of the higher boiling components of the composition.

Example 2

To 100 parts of 2,2'-dichlorobiphenyl was added about 2 parts of anhydrous aluminum chloride. Dry hydrogen chloride gas was passed through the mixture such that said mixture was essentially saturated therewith. The reaction vessel was then sealed and placed in a 100° C. bath for a period of 1 hour over which time the mixture was agitated. The reaction mixture was filtered and the filtrate components determined by vapor phase chromatographic analysis. The reaction mixture was found to consist of about 45% 2,2'-dichlorobiphenyl; 45% 2,3'-dichlorobiphenyl; 7% 2,4'-dichlorobiphenyl; 1.8% 3,3'-dichlorobiphenyl; 1.4% 3,4'-dichlorobiphenyl; and a trace of 4,4'-dichlorobiphenyl.

It will be seen from the foregoing examples that 2,2'-dichlorobiphenyl is relatively rapidly converted to the 2,3'- and 2,4'-isomers and that this rate of conversion is substantially more rapid than the conversion of said isomers to the 3,3'-, 3,4'- and 4,4'-isomers. In practice it is normally preferred to effect the conversion of from about 50 to about 70 percent of the 2,2'-dihalobiphenyl to the predominately 2,3'- and 2,4'-isomer compositions in order to preclude the buildup of larger quantities of the 3,3'-, 3,4'- and 4,4'-isomers. The reaction mixture can then be fractionally distilled to recover the fraction rich in 2,3'- and 2,4'-isomers and the fraction rich in 2,2'-isomer can be recycled for further treatment.

It will be apparent to those skilled in the art, as aforesaid, that any composition rich in 2,2'-dihalobiphenyl can be isomerized in the above-disclosed manner to provide a greater yield of useful trihalobiphenyl compositions for employment as dielectric and heat-exchanging media. Thus about 20 percent or more of the by-product components of my said parent application can be converted and upgraded to provide a composition having greater commercial and monetary value than such prior by-product compositions, whereby the process of my said parent application together with the improvement of the present process enables more efficient utilization of the initial composition as dielectric compositions.

The polyhalogenated biphenyl compositions of this application alone, or together with other such compositions, for example, that of my said parent application, are particularly useful as dielectric and heat-exchanging media in view of their high dielectric constants, excellent thermal stability, resistance to oxidation, non-flammability, etc. Thus, such compositions can be employed as electrical insulating and cooling media for transformers, cables, switches and other electrical apparatus, and as coating and impregnating compositions for paper, fabric, and other porous materials which combinations can be employed in the production of capacitors, as wrapping for electrical cables, etc., e.g. electrical condensers can be produced by interleaving a plurality of porous sheets, such as linen or kraft paper, with a plurality of sheets of metal foil, such as aluminum or tin, and rolling said interleaved sheets to effect the formation of the condenser. The rolled condenser can then be impregnated with the compositions of this inventon by any suitable means, such as vacuum impregnation and the like.

Additionally the polyhalogenated biphenyl compositions of this application can also be employed to upgrade the dielectric properties of various prior art chlorinated biphenyl compositions and other halogenated organic compounds as desired. Preferably the present trihalobiphenyl compositions are present therein in a major amount, i.e. at least 50 weight percent of the new composition. Also small amounts of stabilizers, generally of the order of from about 0.05 to about 1 percent, based on the weight of the halogenated organic composition, can be incorporated with the aforesaid compositions to serve as scavengers for any hydrogen halide which may be present in the composition. Illustrative suitable stabilizers are dibutyl diphenyl tin, tetraphenyl tin, diphenyl tin diethylate, aluminum isopropylate, zinc dithiocarbamate and substituted derivatives thereof, amidated-N-phosphoryl-o-aminobiphenyl, o- and p-anisidine, p-nitroaniline, 2,4-diaminodiphenylamine, various organic antimony compounds, etc.

The halogenation of biphenyl and further halogenation of halogenated biphenyls, e.g. chlorinated biphenyls, are effected in the presence of a strong Lewis acid catalyst such as ferric chloride, aluminum chloride, aluminum bromide, stannic chloride, antimony trichloride, antimony pentachloride, titanium tetrachloride, gallium trichloride, boron trifluoride, and the like as well as bromides and iodides of such metals. When ferric chloride is employed an amount of from about 0.05 to about 1.0 or more, and preferably from about 0.2 to about 0.6, weight percent based on the biphenyl and/or halogenated biphenyl compositions, is satisfactory. The quantity of various other strong Lewis acid catalyst employed in the halogenation reaction can be varied as shown for the illustrative ferric chloride catalyst times the ratio of the molecular weight of the particular catalyst material selected to the molecular weight of ferric chloride. Additionally it will be understood that the Lewis acid catalysts can be employed as mixed compositions as well as singly. The reaction temperatures for halogenation can vary over a relatively large range depending on the selection of the Lewis acid catalyst. However, such reaction temperatures will generally range from about 40° C. to about 150° C. and preferably range from about 100° C to about 140° C.

I claim:

1. A method of isomerizing a composition essentially containing from about 50 to about 100 weight percent of a 2,2'-dihalobiphenyl compound, wherein the halo atom has an atomic number up to 53, comprising treating said composition in the presence of from about 0.1 to about 5 weight percent of anhydrous aluminum chloride and anhydrous hydrogen chloride at a temperature of from about 50° C. to about 250° C. for a sufficient time to isomerize a major portion of the 2,2'-dihalobiphenyl to 2,3'-dihalobiphenyl and 2,4'-dihalobiphenyl, fractionating the reaction mixture to recover the said isomerized products, halogenating the said isomerized products by the further addition of about one halogen atom per dihalobiphenyl molecule in the presence of a strong Lewis acid and recovering the essentially 2,3',X-trihalobiphenyl and 2,4',X-trihalobiphenyl dielectric composition, wherein X is a halogen atom substituent to the biphenyl molecule respectively located at other than the 2,3'- and 2,4'-positions.

2. The method of claim 1 wherein the strong Lewis acid catalyst is selected from the group consisting of ferric chloride, aluminum chloride, aluminum bromide, stannic chloride, antimony trichloride, antimony pentachloride, titanium tetrachloride, gallium trichloride, boron trifluoride and mixtures thereof, the halogenation temperature varies from about 40° C. to about 150° C., and the isomerization reaction temperature is from about 70° C. to about 180° C.

3. The method of claim 2, wherein the halogen is chlorine.

4. The method of claim 3, wherein the anhydrous aluminum chloride isomerization catalyst is present in an amount of from about 0.5 to about 2 weight percent.

5. The method of claim 4, wherein the Lewis acid catalyst is ferric chloride.

6. The method of claim 4, wherein the Lewis acid catalyst is stannic chloride.

7. The method of claim 4, wherein the Lewis acid catalyst is aluminum chloride.

8. The method of claim 4, wherein the Lewis acid catalyst is titanium tetrachloride.

9. The method of claim 4, wherein the Lewis acid catalyst is antimony pentachloride.

10. A method of providing an improved yield of a dielectric composition comprising the halogenation of biphenyl in the presence of a strong Lewis acid catalyst to effect the introduction of about two atoms of halogen per molecule, wherein the said halogen atoms have an atomic number up to 53, fractionating the dihalogenated biphenyl to recover a fraction rich in 2,2'dihalobiphenyl, treating said fraction in the presence of from about 0.1 to about 5 weight percent of anhydrous aluminum chloride and anhydrous hydrogen chloride at a temperature of from about 50° C. to about 250° C. for a sufficient time to isomerize a major portion of the 2,2'-dihalobiphenyl to 2,3'-dihalobiphenyl and 2,4'-dihalobiphenyl, fractionating the reaction mixture to recover an isomerized fraction rich in 2,3'-dihalobiphenyl and 2,4'-dihalobiphenyl, halogenating the said isomerized fraction by the further addition of about one halogen atom per dihalobiphenyl molecule in the presence of a strong Lewis acid and recovering the essentially 2,3',X-trihalobiphenyl and 2,4',X-trihalobiphenyl dielectric composition, wherein X is a halogen atom substituent to the biphenyl molecule respectively located at other than the 2,3'- and 2,4'-positions.

11. The method of claim 10, wherein the halogen is chlorine.

References Cited in the file of this patent
FOREIGN PATENTS
804,016    Great Britain _____ Nov. 5, 1958